(12) United States Patent
Slansky

(10) Patent No.: US 8,579,148 B2
(45) Date of Patent: Nov. 12, 2013

(54) COVER AND STRAW FOR USE WITH A CONTAINER

(75) Inventor: Cindy Slansky, Huntington Station, NY (US)

(73) Assignee: GreenPaxx LLC, Huntington Station, NY (US)

( * ) Notice: Subject to any disclaimer, the term of this patent is extended or adjusted under 35 U.S.C. 154(b) by 35 days.

(21) Appl. No.: 13/309,216

(22) Filed: Dec. 1, 2011

(65) Prior Publication Data

US 2012/0138622 A1    Jun. 7, 2012

Related U.S. Application Data

(60) Provisional application No. 61/458,769, filed on Dec. 2, 2010, provisional application No. 61/458,940, filed on Dec. 6, 2010.

(51) Int. Cl.
*A47G 21/18* (2006.01)
*B65D 47/00* (2006.01)
*B65D 83/00* (2006.01)

(52) U.S. Cl.
USPC ........... 220/707; 220/703; 220/705; 220/709; 215/229; 215/387; 215/388; 239/33

(58) Field of Classification Search
USPC ................. 220/703, 705, 707, 709, 710, 780; 215/229, 387, 388; 293/33; 239/33
See application file for complete search history.

(56) References Cited

U.S. PATENT DOCUMENTS

| | | |
|---|---|---|
| 3,326,695 A * | 6/1967 | Neuhauser ..................... 426/85 |
| 3,721,361 A | 3/1973 | Barry et al. |
| 3,734,360 A | 5/1973 | Brown |
| 3,738,529 A | 6/1973 | Rose |
| 3,925,890 A | 12/1975 | Frodsham |
| 4,183,443 A | 1/1980 | Deparales et al. |
| 4,194,627 A | 3/1980 | Christensen |
| 4,508,235 A | 4/1985 | Steele et al. |
| 4,631,715 A | 12/1986 | Hoover |
| 4,688,721 A | 8/1987 | Inaba |
| 4,703,873 A | 11/1987 | Geren |
| 4,736,887 A | 4/1988 | Inaba |
| 4,852,763 A | 8/1989 | Dimberio |
| 4,909,437 A | 3/1990 | Kang |
| 4,927,047 A | 5/1990 | Stuber et al. |
| 4,948,009 A | 8/1990 | Sawatani |
| 4,978,566 A | 12/1990 | Scheurer et al. |
| 5,025,947 A | 6/1991 | Leone |
| 5,039,012 A | 8/1991 | Inaba |
| 5,078,291 A | 1/1992 | Gilmour |

(Continued)

*Primary Examiner* — Anthony Stashick
*Assistant Examiner* — Madison L Poos
(74) *Attorney, Agent, or Firm* — Leason Ellis LLP

(57) ABSTRACT

A reusable straw includes a first part having a hollow elongated body that has a first end and an opposing second end and a second part having a hollow elongated body that has a first end and an opposing second end. The second part has a width that allows the first part to be received within a hollow interior of the first part. A first coupling member is formed along an inner surface of the first part proximate the first end; and a second coupling member is formed along an outer surface of the second part at the first end thereof. The first and second coupling members mate together to securely and sealingly couple the second part to the first part. The first coupling member is either a male member or a female member and the second coupling member is complementary and is the opposite member.

8 Claims, 7 Drawing Sheets

(56) References Cited

U.S. PATENT DOCUMENTS

| | | |
|---|---|---|
| 5,102,002 A | 4/1992 | Whitley |
| 5,109,995 A | 5/1992 | Lou |
| 5,117,980 A | 6/1992 | Ionides |
| 5,273,176 A | 12/1993 | Diaz |
| 5,322,578 A | 6/1994 | Ogle et al. |
| 5,346,088 A | 9/1994 | Brimo, II |
| 5,361,987 A | 11/1994 | Matheussen et al. |
| 5,402,904 A | 4/1995 | Close |
| 5,415,002 A | 5/1995 | Koenig |
| 5,415,312 A | 5/1995 | Mueller |
| 5,431,297 A | 7/1995 | Rosello |
| 5,568,973 A | 10/1996 | Gorab |
| 5,582,320 A | 12/1996 | Lin |
| 5,617,970 A | 4/1997 | Lee |
| 5,749,491 A | 5/1998 | Wylder et al. |
| 5,820,023 A | 10/1998 | Kristensson |
| 5,897,013 A | 4/1999 | Manganiello |
| 5,931,383 A | 8/1999 | Palmer et al. |
| 6,158,155 A | 12/2000 | Boney |
| 6,302,287 B1 | 10/2001 | Heiner |
| 6,375,019 B1 * | 4/2002 | Hirota et al. .......... 215/229 |
| 6,390,749 B2 | 5/2002 | Song |
| 6,431,382 B1 | 8/2002 | Li |
| 6,478,179 B1 | 11/2002 | Alexander |
| 6,578,303 B2 | 6/2003 | Richards |
| 6,722,518 B1 | 4/2004 | Bartz |
| 6,889,859 B1 | 5/2005 | Leon |
| 6,919,025 B2 | 7/2005 | Cluff et al. |
| 6,929,191 B2 | 8/2005 | Kim |
| 7,040,547 B1 | 5/2006 | Nelson |
| 7,337,705 B1 | 3/2008 | Catena et al. |
| 7,584,900 B2 | 9/2009 | White et al. |
| 7,731,101 B2 | 6/2010 | Fabrizio et al. |
| 7,789,320 B1 | 9/2010 | Schwartz |
| 7,823,802 B1 | 11/2010 | Roche et al. |
| 2002/0070219 A1 | 6/2002 | Song |
| 2002/0145000 A1 | 10/2002 | Li |
| 2003/0006293 A1 | 1/2003 | Lee |
| 2003/0116574 A1 | 6/2003 | Buntain |
| 2003/0132307 A1 | 7/2003 | Park |
| 2004/0074396 A1 | 4/2004 | Murray |
| 2004/0140314 A1 | 7/2004 | Li |
| 2004/0256386 A1 | 12/2004 | Lafortune |
| 2005/0109857 A1 | 5/2005 | Boone |
| 2005/0142252 A1 | 6/2005 | Brown et al. |
| 2006/0008744 A1 | 1/2006 | Hsiao et al. |
| 2006/0016108 A1 | 1/2006 | Watts |
| 2006/0151426 A1 | 7/2006 | Peters |
| 2006/0180593 A1 | 8/2006 | White |
| 2006/0201186 A1 | 9/2006 | Smolko et al. |
| 2006/0255169 A1 | 11/2006 | Gieson |
| 2006/0255170 A1 | 11/2006 | Kim |
| 2006/0286214 A1 | 12/2006 | Weiss et al. |
| 2007/0090081 A1 | 4/2007 | Briscoe et al. |
| 2007/0131700 A1 | 6/2007 | Honkawa et al. |
| 2008/0128529 A1 | 6/2008 | Fernandez |
| 2008/0251597 A1 | 10/2008 | Pearson |
| 2009/0001092 A1 | 1/2009 | Jenkins |
| 2009/0026218 A1 | 1/2009 | Wong |
| 2009/0139952 A1 * | 6/2009 | Raman et al. .......... 215/229 |
| 2009/0283526 A1 | 11/2009 | Pierce et al. |
| 2009/0314852 A1 | 12/2009 | Fabrizio et al. |
| 2010/0181282 A1 | 7/2010 | Raman |
| 2011/0057050 A1 * | 3/2011 | Shakur-Jenkins .......... 239/33 |

\* cited by examiner

COVER AND STRAW FOR USE WITH A CONTAINER

CROSS REFERENCE TO RELATED APPLICATION

The present application claims the benefit of U.S. patent application Ser. No. 61/458,769, filed Dec. 2, 2010, and U.S. patent application Ser. No. 61/458,940, filed Dec. 6, 2010, each of which is hereby incorporated by reference in its entirety.

TECHNICAL FIELD

The present invention relates to beverage containers and in particular, to a container cover that is configured to fit various sizes of beverage containers and to a two piece straw that includes guide indicia to assist in assembly. Each of the cover and straw is preferably formed of silicone to provide an infinitely reusable product that can be used with a number of different liquids and is refrigerator, microwave and dishwasher-safe.

BACKGROUND

Liquid consumption is essential to support the lives of all human beings. Liquids are typically held in some type of container, such as a cup, can or bottle or the like, and sometimes, an accessory (facilitator) in the form of a straw is used to facilitate consumption of the liquid.

It is quite common for a beverage container to be accidentally tipped over, causing the liquid contents of the beverage container to spill out of the interior of the beverage container. Many times the beverage container is utilized in an area where it is particularly undesirable to spill the contents, such as within the interior of an automobile. In addition, the problem of spillage is particular acute when dealing with children. Children tend to be clumsy and not as cautious as adults, resulting in even a greater risk of spillage of the beverage container. A beverage container is needed which provides an effective and economical way of preventing unwanted spillage of the contents of the beverage container.

While various container lids and covers are available, many have a shared shortcoming in that they are constructed to mate and seal with one type of container and are not capable of forming a seal with a different type of container. Such lids are limited in their use since they cannot be used with other containers.

Similarly, while there are a varied of drinking systems including straws, these products also have deficiencies in that they are hard to clean and many are not particularly suitable for cleaning in a dishwasher.

There is therefore a need for an improved container cover/lid and straw that: can be used with hot and cold liquids, is easy to use, is easy to clean and is formed of a material that is more environmentally friendly.

SUMMARY

In accordance with one embodiment, a reusable straw includes a first part having a hollow elongated body that has a first end and an opposing second end and a second part having a hollow elongated body that has a first end and an opposing second end. The second part has a width that allows the first part to be received within a hollow interior of the first part. A first coupling member is formed along an inner surface of the first part proximate the first end; and a second coupling member is formed along an outer surface of the second part at the first end thereof. The first and second coupling members mate together to securely and sealingly couple the second part to the first part. The first coupling member is either a male member or a female member and the second coupling member is complementary and is the opposite member.

The straw can also include a first indicator indicia formed along an outer surface of the first part proximate but spaced from the first end thereof and also a second indicator indicia formed along an outer surface of the second part proximate but spaced from the first end thereof. When the first and second coupling members mate securely together, the second indicator indicia is at least substantially obscured by the first part, thereby providing a visual indicator to a user that the first and second parts are properly coupled to one another.

A sealable cover for a container is also provided and includes a flexible body formed of 100% non-toxic food grade silicon. The body includes a base portion and at least two sealing wall members protruding outwardly therefrom and spaced apart from one another so as to define at least two spaces for receiving a rim of a container to provide a sealed coupling between the cover and the container. The flexible body also has an opening that is substantially self-sealing and can receive the straw.

BRIEF DESCRIPTION OF THE DRAWING FIGURES

DETAILED DESCRIPTION OF CERTAIN EMBODIMENTS

Figure 1:
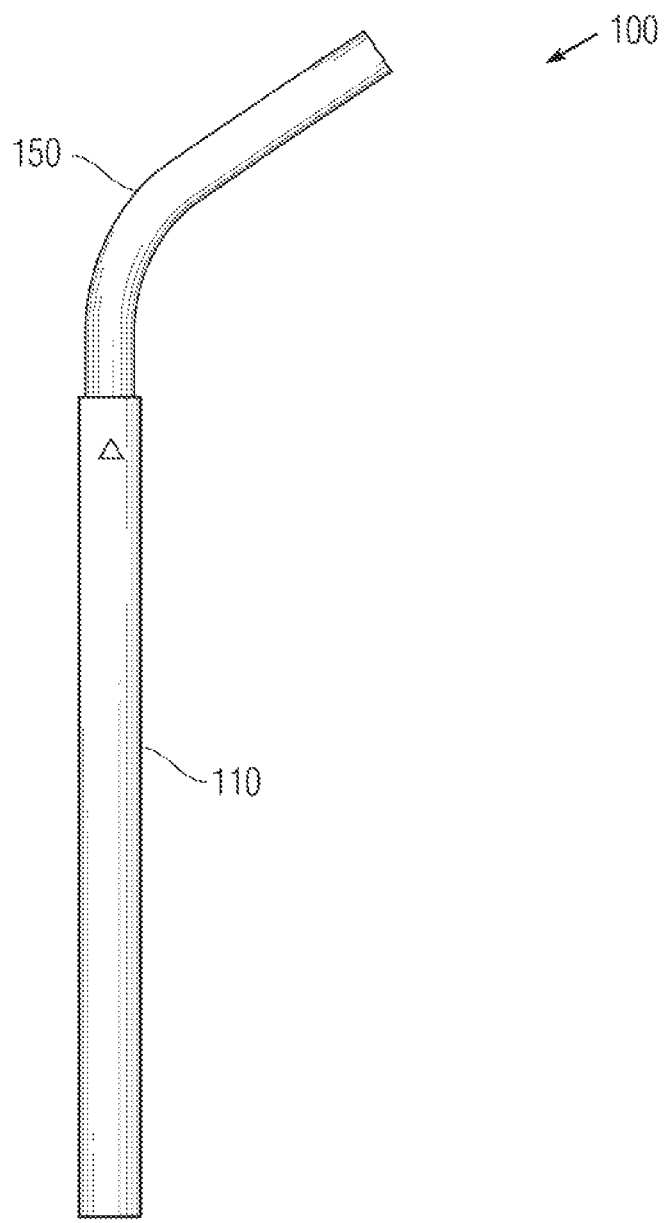
FIG. 1 is a side elevation view of a drinking straw assembly in an assembled position.
Figure 2:
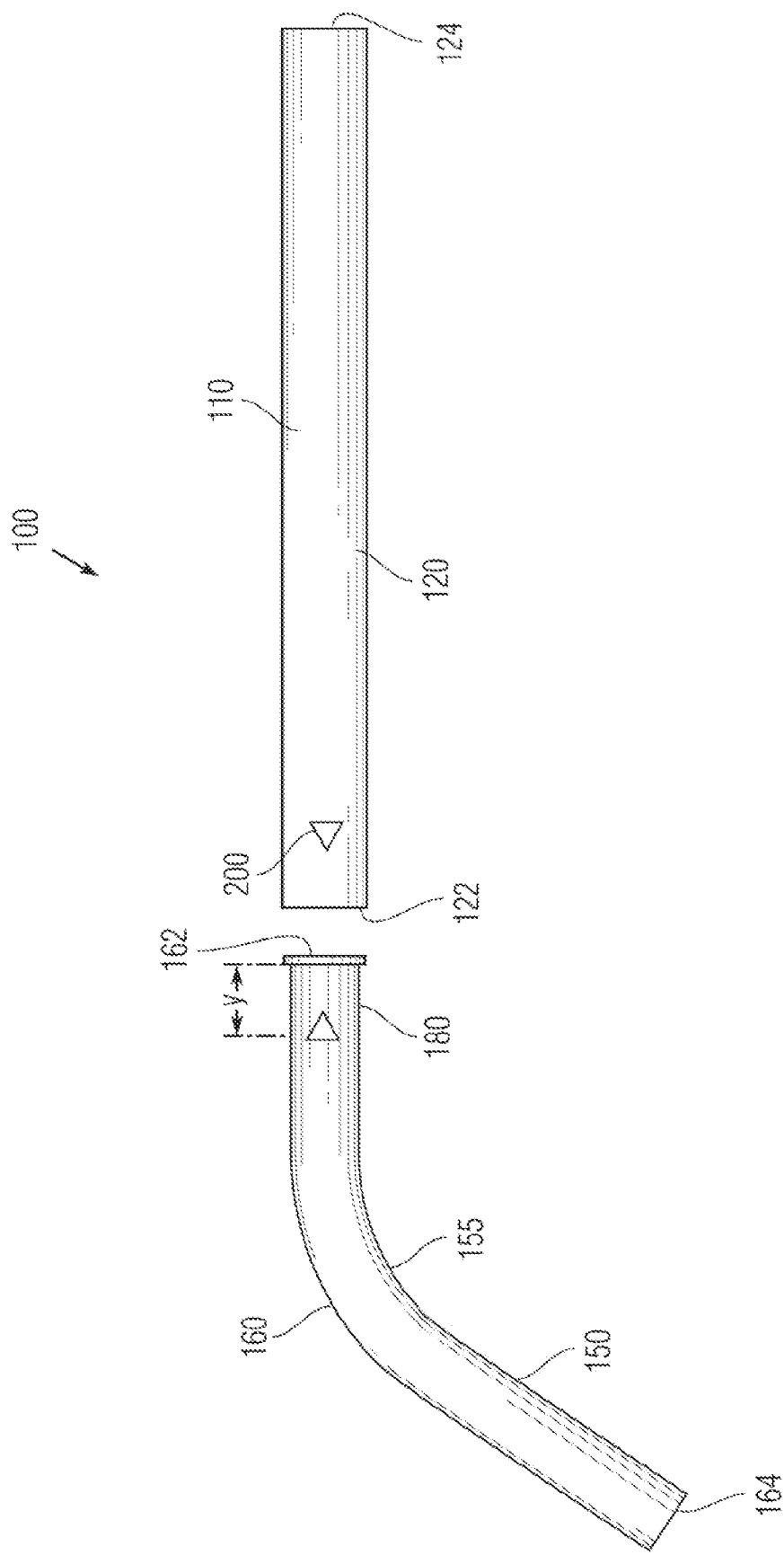
FIG. 2 is a side elevation exploded view of a drinking straw assembly showing first and second complementary parts.

In one aspect, the present invention is directed to a drinking straw 100 that is formed of a first part 110 and a second part 150 that is complementary to the first part 110 and is intended for mating therewith to form the assembled drinking straw 100. The first part 110 has an elongated hollow body 120 that has a first end 122 and an opposing second end 124. A bore or channel is formed therein and is open at both ends 122, 124 to permit fluid to flow through the first part 110.

In the illustrated embodiment, the hollow body 120 is in the form of a cylindrical shaped tubular structure; however, it will be understood that the body 120 can assume other shapes so along as it is tubular in nature and fluid can flow from one end to the other end.

Figure 4:
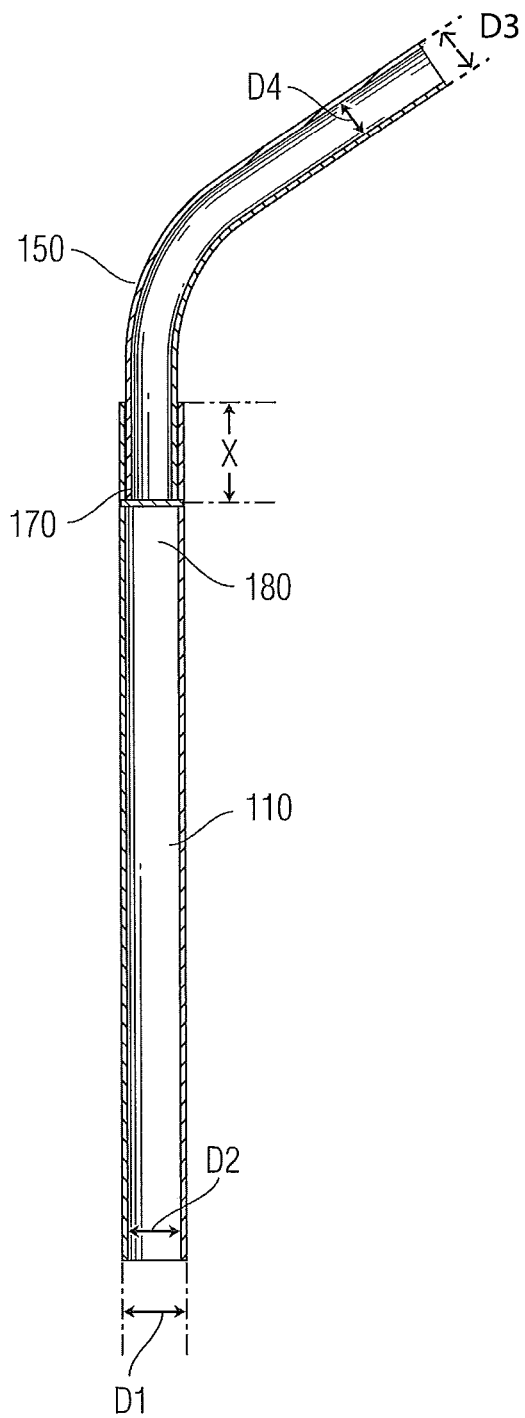
FIG. 4 is a side elevation view in cross-section of the drinking straw assembly with the first and second parts mated together.

The body 120 is defined by an outer dimension and an inner dimension and when the body 120 is in the form of a cylindrically shaped tube, the outer dimension is an outer diameter and the inner dimension is the inner diameter. In FIG. 4, the outer diameter is identified as D1 and the inner diameter is identified as D2.

In accordance with the present invention, the first end 122 is constructed different than the second end 124 and represents the end that mates with the second part 150. The first end 122 includes a first means 170 for securely yet releasably attaching the first end 122 to the second part 150. The means 170 can be any number of different types of fastening or attachment means to allow the first and second parts 110, 150 to mate with one another. For example, a frictional or snap-fit can be provided between the first and second parts 110, 150. When a snap-fit is used, the first means 170 can be in the form of a male or female feature. The first means 170 can thus be thought of as a coupling member to couple the two straw parts to one another.

Figure 3:
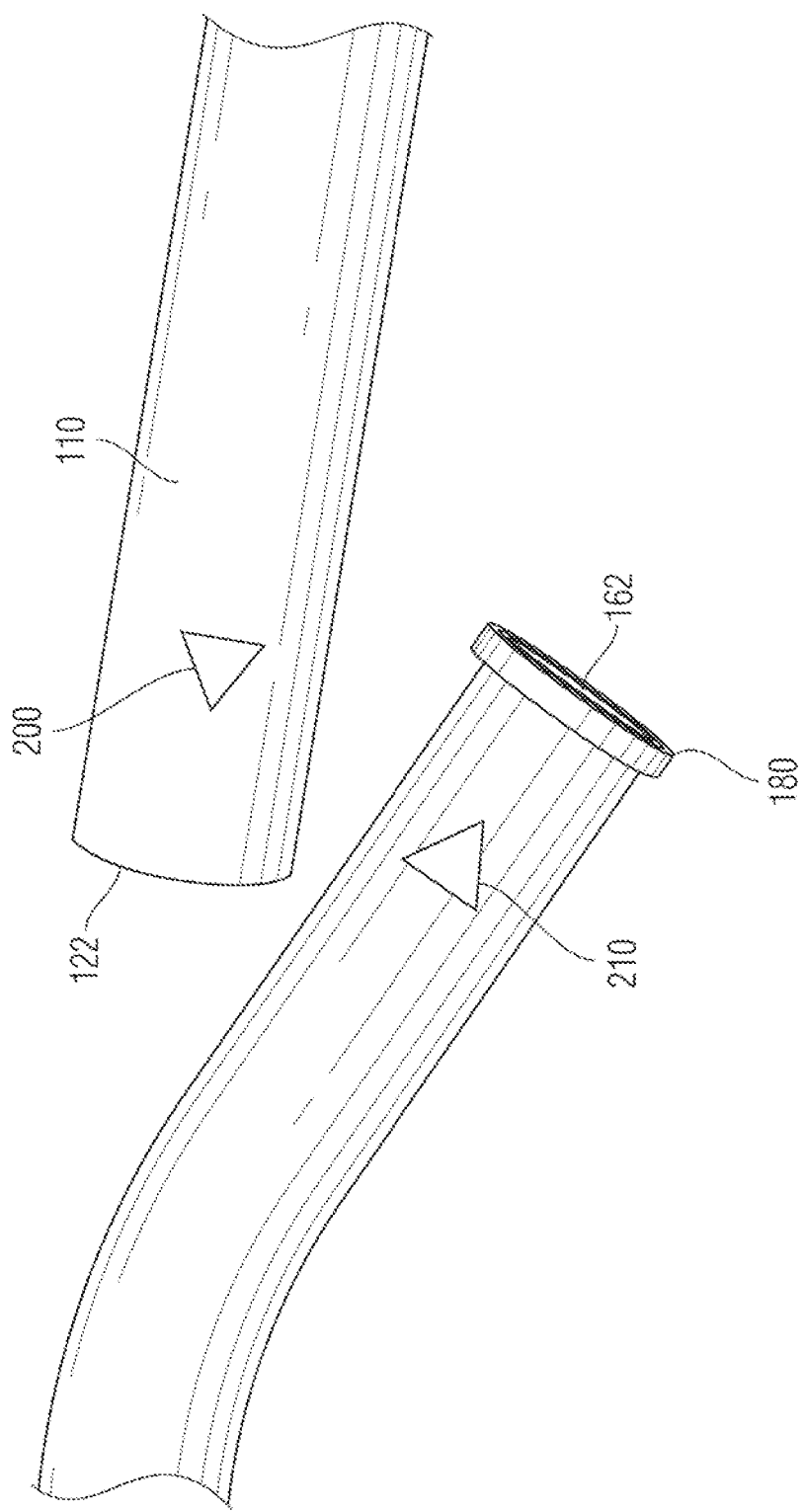
FIG. 3 is an enlarged side elevation view of the ends of the first and second parts exploded.

In the illustrated embodiment, the first means 170 is in the form of a female feature, such as a recess. For example, the recess can be a circular shaped recess or track 170 that is formed along the inner surface of the first part 110. The recess 170 thus represents a region of the body 120 that has a reduced thickness. The recess 170 is spaced a distance X from the first end 122 as shown in FIG. 3. It will be appreciated that the recess 170 can be a continuous track 170, as shown, or it can be segmented track that lies within the same plane (thereby forming discrete recessed sections).

In addition, the first end 122 includes a first guide or locator indicia 200 to assist the user in properly mating the first part 110 to the second part 150. More particularly, the first indicia 200 can be in the form of a printed mark that is formed on the outside of the first part 110 at or near the first end 122. In the illustrated embodiment, the first indicia 200 is in the form of a printed arrow in which the tip points towards the first end 122. The first indicia 200 easily identifies the first end 122 as being the end that contains the first means 170 since from the outside, the body 120 has a uniform appearance and one end cannot be easily identified from the other end.

The second part 150 has an elongated hollow body 160 that has a first end 162 and an opposing second end 164. A bore or channel is formed therein and is open at both ends 162, 164 to permit fluid to flow through the second part 150.

In the illustrated embodiment, the hollow body 160 is in the form of a cylindrically shaped tubular structure; however, it will be understood that the body 160 can assume other cross-sectional shapes so along as it is tubular in nature and fluid can flow from one end to the other end.

The body 160 is defined by an outer dimension and an inner dimension and when the body 160 is in the form of a cylindrically shaped tube, the outer dimension is an outer diameter and the inner dimension is the inner diameter. In FIG. 4, the outer diameter is identified as D3 and the inner diameter is identified as D4.

In accordance with the present invention, the first end 162 is constructed different than the second end 164 and represents the end that mates with the first part 110. The first end 162 includes a second means 180 for securely yet releasably attaching the first end 162 to the first end 122 of the first part 110. The means 180 can be any number of different types of fastening or attachment means to allow the first and second parts 110, 150 to mate with one another. For example, a frictional or snap-fit can be provided between the first and second parts 110, 150. When a snap-fit is used, the second means 180 can be in the form of a male or female feature. The second means 180 can thus be thought of as a coupling member to couple the two straw parts to one another.

When a snap-fit is used, the design of the present invention provides tactile and/or auditory feedback to the user that the parts 110, 150 are properly and securely attached to one another.

In the illustrated embodiment, the second means 180 is in the form of a male feature, such as a protrusion. For example, the protrusion can be an annular shaped flange 180 that is formed along the exterior surface of the first part 110. The flange 180 thus represents a region of the body 160 that has an increased thickness. The flange 180 is located at the first end 162. It will be appreciated that the flange 180 can be a continuous flange 180, as shown, or it can be segmented flange that lies within the same plane (thereby forming discrete flange sections).

The outer diameter D3 of the second part 150 is selected such that it is slightly less than the inner diameter D2 of the first part 110 and thus snugly fits therein. The material characteristics, discussed below, of the first and second parts 110, 150 permit the parts to be freely flexed to allow insertion of the first end 162 into the first end 122 of the first part 110.

The second part 150 can include a preformed bend 155, as shown, or it can be formed as a straight (linear) part.

In addition, the first end 162 includes a second guide or locator indicia 210 to assist the user in properly mating the first part 110 to the second part 150. More particularly, the second indicia 210 can be in the form of a printed mark that is formed on the outside of the second part 150 at or near the first end 162. In the illustrated embodiment, the second indicia 210 is in the form of a printed arrow in which the pointed tip points towards either the first end 162 or the second end 164. The second indicia 210 easily identifies the first end 162 as being the end that contains the second means 180 since from the outside, the body 160 has a uniform appearance and one end cannot be easily identified from the other end.

The second indicia 210 is formed a distance Y from the first end 162.

The first and second indicia 200, 210 are designed to also serve as a visual indicator to indicate that the first and second parts 110, 150 are properly mated together (i.e., that the flange 180 is securely seated in the recess 170). More specifically, when the first and second parts 110, 150 are properly mated together, the second indicia is 210 is at least substantially obscured by the body 120 of the first part 110. In other words, as the user inserts the first end 162 of the second part 150 and further inserts it into the end 122, more and more of the second indicia 210 becomes obscured until the flange 180 seats within the recess 170. At this point, the second indicia 210 is at least substantially or entirely obscured and covered by the body 120, thereby indicating a proper mating between the first and second parts 110, 150. In contrast, if the user still sees a significant amount or any of the second indicia 210, then the first and second parts 110, 150 are not properly mated together and the second part 150 needs to be inserted more.

The indicia 200, 210 thus provides a visual guide to indicate to the user which ends of the parts 110, 150 are to be mated together and also provide a visual indicator that a proper mating has been achieved.

The straw 100 can be formed of different materials that are suitable for the intended application; however, in accordance with the present invention, the first and second parts 110, 150 are formed of silicone. For example, the first and second parts 110, 150 are made from 100% non-toxic food-grade silicone. The two piece construction makes it easier to wash in a dishwasher. The straw 100 is infinitely reusable and can withstand extreme temperatures such as those routinely employed by dishwashers or boiling temperatures such as used to sterilize baby bottle nipples.

The straw 100 is generally but not limited to, a wider cylindrical shape than conventional beverage straws making it easier to clean and allowing larger food particles to flow freely thru said straw. As mentioned above, the present invention can be manufactured all or in part of silicone.

In addition, the straw 100 can include two or more different colors to differentiate parts and/or features. For example, the second part 110 can be formed of a first color and the second part 150 can be formed of a different color and/or the male-female coupling features 180, 170 can be designed so that they are easily mated, such as being a different color than the rest of the straw 100. In other words, the recess 170 and flange 180 can be formed of a color that is different than the respective surrounding bodies.

The straw 100 can also have artistic designs incorporated into its manufacturing.

The straw 100 can come in many different sizes so that it fits many different sized beverage containers, such that an adult or child may be able to use it.

It will also be understood that the male and female features as shown can be reversed in that the female feature (e.g., a recess) can be formed near the first end of the second part and a male feature (e.g., a protrusion or flange) can be formed along the inner surface of the first part. The mating between the two is the same as described herein.

Being manufactured all or in part from silicone allows the straw 100 to be used for hot or cold beverages or foods, as silicone is completely inert and non-reactive when heated or cooled. This revolutionizes the way we could eat soup on the go. The straw 100 can be used at home or brought to a retail store to be used in lieu of the disposable plastic beverage straws that are commonly used.

Being manufactures all or in part of silicone makes the straw 100 of the present invention non-toxic whereas all plastics have chemicals known to be harmful to humans when produced, used for beverages, and disposed of. The lifecycle of plastic leaves a negative environmental and health imprint from its production to its disposal. Silicone does not. Silicone does not react with or leach any chemicals. Silicone also has natural non-stick properties that make it easier to clean than other reusable straws and other rubber materials. The two-piece assembly also makes the present invention easier to clean since the individual parts can be cleaned and examined.

Figure 5:
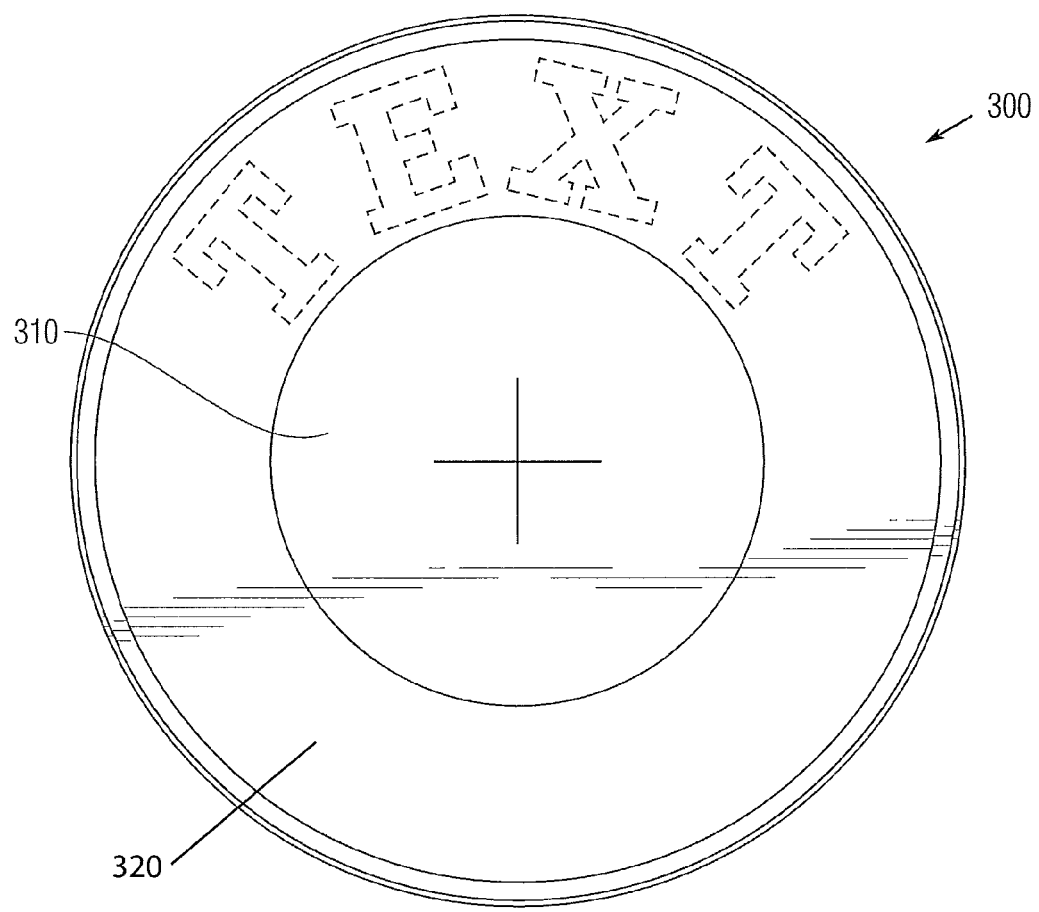
FIG. 5 is a top plan view of a container cover according to one embodiment.

FIGS. 4-5 illustrate a container cover, cap, or lid 300 for use with a container that has a rim (lip) formed at an open end thereof.

The cover 300 is formed of a base 310 that has a first face 320 and an opposing second face 330. The first face 320 faces away from the container, while the second face 330 faces the container. The first face 320 can be at least substantially planar (flat) as shown or it can have one or more raised or recessed sections. The first face 320 can include indicia, such as a corporate logo, that can be formed using any number of techniques, including printing, etc.

The second face 330 includes a plurality of sealing members 400 for fluidly sealing the cover 300 to the open end of the container. The sealing members 400 include a first sealing member 410 that extends about the peripheral edge of the base 310. The sealing member 410 can be in the form of a flexible wall that is formed perpendicular to the second face 330. The sealing members 400 can include one or more additional sealing members that are located within the boundary of the first sealing member 410. In the illustrated embodiment, a second sealing member 420 is formed inside of the first sealing member 410. The sealing member 420 can be in the form of a flexible wall that is formed perpendicular to the second face 330.

A first space 450 is formed and defined between the first and second sealing members 410, 420 and a second space 460 is defined within the inner surface of the second sealing member 420. The provision of multiple sealing members (walls) 410, 420 allows the cover 400 to be used with different sized cups such that a seal is formed. For example, with one size cup, the lip at the open end of the cup is received within the first space 450 such that the lip sealingly contacts the inner surface of the first sealing member 410 and the outer surface of the second sealing member 420. Alternatively, with another size cup, the lip at the open end of the cup is received within the second space 460 with the lip sealingly seating against the inner surface of the second sealing member 420.

It will be understood that a third and additional walls can be provided and formed in the same manner to allow the cover 400 to sealingly mate with additional sized containers (that have different diameters at the open end thereof).

When the body 310 has a circular shape, the first sealing member 410 thus is in the form of an annular (ring) shaped wall that extends outwardly from the base 310. The second sealing member 420 is in the form an annular shaped wall and therefore the members 410, 420 are concentric walls.

The cover 300 also includes a means 470 to allow fluid to at least selectively pass therethrough and exit the container. The means 470 can be in the form of an opening or slit and in particular, can be in the form of a self-sealing slit 475. In the illustrated embodiment, the slit 475 is centrally formed and is defined by two cuts that are formed perpendicular to one another and intersect one another. The slit 475 thus resembles and has a cross-hair design with a width of about 2.0 cm. As with the entire structure, the base 310 is fully flexible and therefore, the slit 475 can be easily opened by separating the slit edges as when an object is inserted therethrough.

The means 470 is at least substantially self-sealing in that when no straw passes therethrough the edges of the slit 475 seat at least substantially against one another so as to at least substantially prevent leakage therethrough.

For example, the slit 475 is constructed to allow the straw 100 to pass therethrough and the edges of the slit 475 seat against the straw 100 (e.g., the first part 110) so as to hold the straw 100 in place.

The cover 300 can be formed of the same materials as the straw 100 and thus, the cover 300 can be in the form of a reusable silicone rubber beverage cap that can be infinitely reused. The cover 300 can be manufactured all or in part of silicone. The cover 300 is generally, but not limited to, a cylindrical or circular shape such as that of the rim of a beverage container. The cover 300 has one or more apertures on its superior aspect for access to beverage or food.

As mentioned above, the present invention has one or more inner rings 410, 420 on its underside so that it fits multiple sized beverage containers while still maintaining all of its protective properties. Each of these inner rings is sized to fit most disposable as well as reusable beverage containers that are found either at retail locations or at the user's home. This is what makes the cover 300 to be superior to other products. It can be used to replace covers found at retail to save these covers (caps) from entering our landfills, and it can be used on almost any sized beverage container at home so that the user can take home-made beverages to go.

The cover 300 is infinitely reusable and can withstand extreme temperatures such as those routinely employed by dishwashers or boiling temperatures such as used to sterilize baby bottle nipples. With its wide range of temperatures, the present invention can be used for cold or hot beverages. It also makes the cap 300 suitable for drinking warm foods such as soups.

Being constructed all or in part of silicone allows the cover 300 of the present invention to be stretched for a tighter, universal fit. It also protects the user from toxic chemicals commonly found in plastic beverage caps and containers. When choosing beverage containers, the cover 300 allows the user to choose alternatives to plastic while still maintaining the portability of the containers they choose. Being constructed all or in part of silicone also makes the cover 300 malleable, as opposed to plastic, which is often rigid. This malleability allows the cover 300 to be folded or stored easily, adding to its convenience over prior caps/covers.

The cover 300 of the present invention allows the user to take their beverages or soups to go while maintaining its spill-resistance. It also keeps beverages fresh and cold, or hot, longer than plastic.

The cover 300 can have several embodiments. One such embodiment may have a flip-back aperture on its rim so that the user may open and close said aperture for access to its contents. This allows the user to eat or drink many consistencies of food and/or beverages such as coffee, tea, thick smoothies or even chunky soups.

Figure 6:
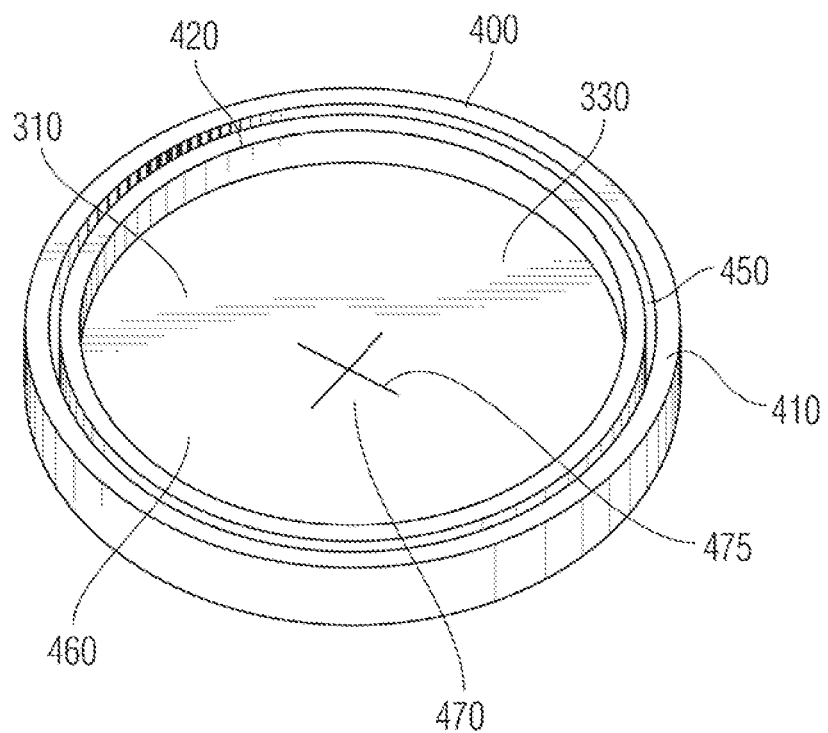
FIG. 6 is a bottom perspective view of the container cover.
Figure 7:
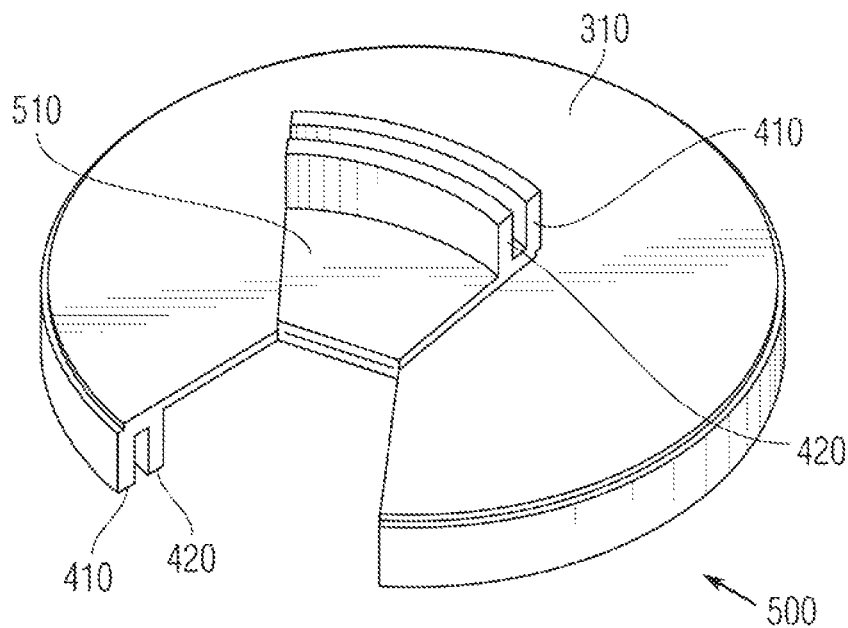
FIG. 7 is a top perspective view of a container cover according to another embodiment with a lid portion in an open position.
Figure 8:
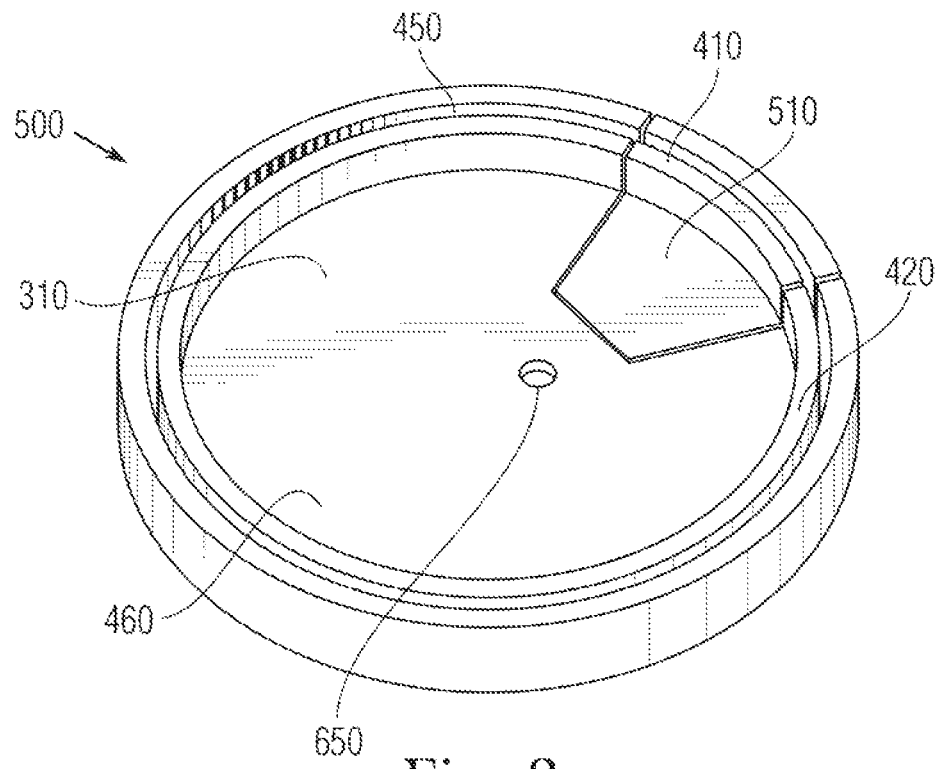
FIG. 8 is a bottom perspective view of the container cover of FIG. 6 with the lid portion in a closed position.

For example, FIGS. 6 and 7 show a cover 500 for a container according to another embodiment. The cover 500 is similar to the cover 300 and therefore, like elements are numbered alike. The main differences are that the cover 500 does not include the slit 475 and instead includes an openable lid portion or tab 510.

The tab 510 is an integral part of the base 310 and is pivotable by means of a living hinge arrangement. The base 310 thus freely pivots between open and closed positions. The tab 510 is thus a wedge shaped portion of the base 310 and includes the sealing members 410, 420. In other words, the sealing members 410, 420 are broken and segmented by the presence of the tab 510. As a result the tab 510 has arcuate shaped sealing members (walls) 410, 420 along, at and near the peripheral edge thereof. When the tab 510 closes, the rim (lip) of the cup is received within the space 450, 460 defined as part of the tab 510.

The flexible nature of the material used to form the base 310 causes the tab 510 to freely close and it can be design to close under its own action due to the resiliency of the material.

A vent hole 650 in the base 310 can be provided to vent hot liquids.

The cover 500 is particularly suited for container holding hot fluids, such as coffee, tea, etc. and allows the user to sip through the drinking opening created by lifting the tab 510. To assist the user in lifting the tab 510, a pull 525 can be provided on the top surface of the tab 510.

Another embodiment can have an aperture that is centrally located that facilitates insertion and use of a beverage straw. The aperture can be simple slits in a circular arrangement.

EXAMPLE

In one embodiment, the outer diameter D1 is about 1.2 cm (e.g., about 1.17 cm); the inner diameter D2 is about 0.9 cm; the outer diameter D3 is about 0.9 cm and the inner diameter D4 is about 0.7 cm. The outer diameter of the flange 180 is about 1.1 cm. The length of the first part 110 can be about 14.5 cm and the length of the second part 150 can be about 7.86 cm.

The first coupling member 170 is located a first distance from the first end 122 of the first part 110 and a second distance measured from a top of the second indicator indicia to the first end 162 of the second part 150 is about equal to the first distance (e.g., each distance about 1.0 cm). A third distance measured from a bottom of the first indicator indicia to the first end of the first part is less than the first distance.

It will be understood that the foregoing dimensions are merely exemplary and the parts can have dimensions depending upon the application.

What is claimed is:

1. A reusable straw comprising:
a first part having a hollow elongated body that has a first end and an opposing second end;
a second part having a hollow elongated body that has a first end and an opposing second end, wherein the second part has a width that allows the first part to be received within a hollow interior of the first part and form a seal therebetween;
a first coupling member formed along an inner surface of the first part proximate the first end;
a second coupling member formed along an outer surface of the second part at the first end thereof, the first and second coupling members mating together to securely and sealingly couple the second part to the first part;
a first indicator indicia formed along an outer surface of the first part proximate but spaced from the first end thereof; and
a second indicator indicia formed along an outer surface of the second part proximate but spaced from the first end thereof, wherein when the first and second coupling members mate securely together, the second indicator indicia is at least substantially obscured by the first part, thereby providing a visual indicator to a user that the first and second parts are properly coupled to one another;
wherein, the first coupling member comprises one of a male member and a female member and the second coupling member is complementary and comprises the other of the male member and female member, wherein insertion of the male member into the female member results in a snap-fit between the first and second parts.

2. The straw of claim 1, wherein the female member comprises an annular shaped recess formed along the inner surface of the first part located a first distance from the first end of the first part and the male member comprises an annular shaped flange disposed at the first end of the second part for reception in the annular shaped recess to form the snap-fit.

3. The straw of claim 1, wherein each of the first and second parts is fully flexible along its entire length and can be completely folded over on top of itself and is formed of 100% non-toxic food grade silicon.

4. The straw of claim 1, wherein the first coupling member is located a first distance from the first end of the first part and a second distance measured from a top of the second indicator indicia to the first end of the second part is about equal to the first distance.

5. The straw of claim 4, wherein a third distance measured from a bottom of the first indicator indicia to the first end of the first part is less than the first distance.

6. A reusable straw comprising:
a first part having a hollow elongated body that has a first end and an opposing second end;
a second part having a hollow elongated body that has a first end and an opposing second end, wherein the second part has a width that allows the first part to be received within a hollow interior of the first part and form a seal therebetween;
a first coupling member formed along an inner surface of the first part proximate the first end; and
a second coupling member formed along an outer surface of the second part at the first end thereof, the first and second coupling members mating together to securely and sealingly couple the second part to the first part;

wherein the first coupling member comprises an annular shaped recess formed along the inner surface of the first part located a first distance from the first end of the first part and the second coupling member comprises an annular shaped flange disposed at the first end of the second part, wherein when the first and second parts are mated together, the annular shaped flange intimately seats within the annular shaped recess so as ensure that the first and second parts are fixedly attached together in a desired orientation.

7. The straw of claim 6, wherein each of the first and second parts is fully flexible along its entire length and can be completely folded on top of itself and is formed of 100% non-toxic food grade silicon.

8. A reusable straw comprising:
- a first part having a hollow elongated body that has a first end and an opposing second end;
- a second part having a hollow elongated body that has a first end and an opposing second end, wherein the second part has a width that allows the first part to be received within a hollow interior of the first part and form a seal therebetween;
- an annular shaped recess formed along an inner surface of the first part proximate the first end;
- an annular shaped flange formed along an outer surface of the second part at the first end thereof, the annular shaped recess and the annular shaped flange mating together to securely and sealingly couple the second part to the first part when the second part is inserted into the first part;
- a first indicator indicia formed along an outer surface of the first part proximate but spaced from the first end thereof; and
- a second indicator indicia formed along an outer surface of the second part proximate but spaced a first distance from the first end thereof, wherein a location and size of the second indicator indicia and a location of the annular shaped recess are selected such that when the annular shaped flange is received in the annular shaped recess and the first and second parts are securely mated together, the second indicator indicia lies at least substantially underneath the first part, thereby providing a visual indicator to a user that the first and second parts are properly coupled to one another based on the second indicator indicia being at least substantially obscured by the first part.

* * * * *